United States Patent
Zhou et al.

(10) Patent No.: US 9,472,945 B2
(45) Date of Patent: Oct. 18, 2016

(54) ELECTRICAL SWITCHING APPARATUS INCLUDING ALTERNATING CURRENT ELECTRONIC TRIP CIRCUIT WITH ARC FAULT DETECTION CIRCUIT

(71) Applicant: EATON CORPORATION, Cleveland, OH (US)

(72) Inventors: Xin Zhou, Franklin Park, PA (US); Robert W. Mueller, Aliquippa, PA (US); David R. Rohn, Venetia, PA (US)

(73) Assignee: EATON CORPORATION, Cleveland, OH (US)

( * ) Notice: Subject to any disclaimer, the term of this patent is extended or adjusted under 35 U.S.C. 154(b) by 490 days.

(21) Appl. No.: 14/132,678

(22) Filed: Dec. 18, 2013

(65) Prior Publication Data
US 2015/0171620 A1 Jun. 18, 2015

(51) Int. Cl.
H02H 7/22 (2006.01)
H02H 1/00 (2006.01)
H01H 9/30 (2006.01)
H01H 83/20 (2006.01)

(52) U.S. Cl.
CPC .............. *H02H 7/222* (2013.01); *H01H 9/30* (2013.01); *H01H 83/20* (2013.01); *H02H 1/0015* (2013.01); *H01H 2083/201* (2013.01)

(58) Field of Classification Search
CPC ...... H02H 7/222; H02H 1/0015; H01H 9/30; H01H 83/20; H01H 2083/201
See application file for complete search history.

(56) References Cited

U.S. PATENT DOCUMENTS

| | | | |
|---|---|---|---|
| 3,430,142 A * | 2/1969 | Covert | G01R 19/20 324/117 R |
| 3,818,337 A * | 6/1974 | Groenenbroom | G01R 19/20 324/117 R |
| 2012/0138442 A1* | 6/2012 | Beatty, Jr. | H01H 71/082 200/51 R |
| 2013/0335861 A1* | 12/2013 | Laschinski | H02H 1/0015 361/2 |

FOREIGN PATENT DOCUMENTS

| | | |
|---|---|---|
| EP | 2 461 345 A2 | 6/2012 |
| WO | 99/43065 A1 | 8/1999 |
| WO | 2007/129213 A1 | 11/2007 |

OTHER PUBLICATIONS

European Patent Office, "International Search Report and Written Opinion", Jan. 23, 2015, 8 pp.

* cited by examiner

*Primary Examiner* — Zeev V Kitov
(74) *Attorney, Agent, or Firm* — Eckert Seamans Cherin & Mellott, LLC; Nathaniel C. Wilks; Grant E. Coffield

(57) ABSTRACT

An electrical switching apparatus includes a transductor circuit that senses a direct current between at least one input terminal and at least one output terminal and outputs an alternating current proportional to the direct current between the input terminal and the output terminal. The electrical switching apparatus also includes a current sensor configured to sense an alternating current component of the direct current. The electrical switching apparatus further includes an alternating current electronic trip circuit including an arc fault detection circuit configured to detect an arc fault based on the sensed alternating current component. The alternating current electronic trip circuit is also configured to control pairs of separable contacts to trip open based on the alternating current output from the transductor circuit or the detected arc fault.

15 Claims, 7 Drawing Sheets

ELECTRICAL SWITCHING APPARATUS INCLUDING ALTERNATING CURRENT ELECTRONIC TRIP CIRCUIT WITH ARC FAULT DETECTION CIRCUIT

CROSS-REFERENCE TO RELATED APPLICATION

This application is related to co-pending U.S. patent application Ser. No. 14/327,705 filed on Dec. 18, 2013, entitled "Electrical Switching Apparatus Including Alternating Current Electronic Trip Circuit With Arc Fault Detection Circuit and Power Supply", the entirety of which is incorporated herein by reference.

BACKGROUND

1. Field

The disclosed concept pertains generally to electrical switching apparatus and, more particularly, to circuit breakers including a plurality of separable contacts.

2. Background Information

Circuit breakers have been used in alternating current (AC) applications and direct current (DC) applications. The applications for DC circuit breakers have been very small. With the larger use of alternative energy sources, such as photovoltaic applications, the DC applications are increasing. DC molded case circuit breakers have used mechanical thermal and magnetic trip units for overload and short circuit protection, while some DC air circuit breakers employ electronic trip units. Magnetic trip units instantaneously trip the circuit breaker when the current in the protected circuit exceeds a predetermined level. However, magnetic trip units are difficult to calibrate and are not as accurate as electronic trip units. Thermal trip units are less susceptible to nuisance tripping, but take a longer amount of time to trip the circuit breaker, and are susceptible to ambient thermal conditions causing accuracy problems. Because of these problems thermal and magnetic trip units are not typically used in the larger size and higher current rated circuit breakers in AC applications, but rather, AC electronic trip units, which use a current transformer to sense the AC current, are used.

Without a time varying magnetic field, the AC current transformer will produce no electromotive force with DC current, which makes the AC electronic trip unit inoperable in DC applications. Certain DC circuit breakers such as DC air circuit breakers have used a DC electronic trip unit in combination with a shunt to sense the DC current in the protected circuit. The DC electronic trip unit provides enhanced control and tripping accuracy of the circuit breaker over thermal and magnetic trip units. However, DC circuit breakers which include a DC electronic trip unit are costly as compared to the high volume and readily available AC electronic trip units.

Photovoltaic applications present difficulties for current DC circuit breakers. In photovoltaic applications, the short circuit current level can be relatively low (e.g., less than 200% of the rated current and usually about 125% to 135% of the rated current). Due to the relatively low short circuit current level, DC circuit breakers which use thermal and magnetic trip units are typically not desirable because it is difficult to set the magnetic trip unit precisely at these low levels and could cause excessive nuisance tripping and the thermal trip unit may not offer adequate protection due to the long time it takes to trip the circuit breaker. Additionally, thermal and magnetic trip units do not provide protection from arc faults. While a DC circuit breaker which uses a DC electronic trip unit can offer suitable circuit protection in photovoltaic applications, the cost of the DC circuit breaker with a DC electronic trip unit is a concern.

There is room for improvement in electrical switching apparatus, such as circuit breakers.

SUMMARY

These needs and others are met by embodiments of the disclosed concept in which an electrical switching apparatus having an electronic trip circuit includes a transductor circuit, a current sensor, and an alternating current electronic trip circuit including an arc fault detection circuit.

In accordance with one aspect of the disclosed concept, an electrical switching apparatus comprises: a plurality of first terminals including two input terminals structured to electrically connect to a direct current power source; a plurality of second terminals including two output terminals structured to electrically connect to a direct current load; a plurality of pairs of separable contacts; an operating mechanism configured to open and close said separable contacts; a trip actuator configured to cooperate with said operating mechanism to trip open said separable contacts; a plurality of conductors that electrically connect each pair of separable contacts between one of said first terminals and one of said second terminals; a transductor circuit including first and second current transformers, the transductor circuit being configured to sense a direct current component of a current flowing between at least one of the input terminals and at least one of the output terminals and to output an alternating current proportional to the direct current component; a current sensor configured to sense an alternating current component of the current flowing between at least one of the input terminals and at least one of the output terminals; and an alternating current electronic trip circuit including an arc fault detection circuit configured to detect an arc fault based on the sensed alternating current component, the alternating current electronic trip circuit being configured to control said trip actuator based on the alternating current output from the transductor circuit or the detected arc fault.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "electrical conductor" shall mean a wire (e.g., without limitation, solid; stranded; insulated; non-insulated), a copper conductor, an aluminum conductor, a suitable metal conductor, or other suitable material or object that permits an electric current to flow easily.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "processor" shall mean a programmable analog and/or digital device that can store, retrieve, and process data; a computer; a workstation; a personal computer; a controller; a digital signal processor; a microprocessor, a microcontroller; a microcomputer; a central processing unit; a mainframe computer; a mini-computer; a server; a networked processor; or any suitable processing device or apparatus.

Figure 1:
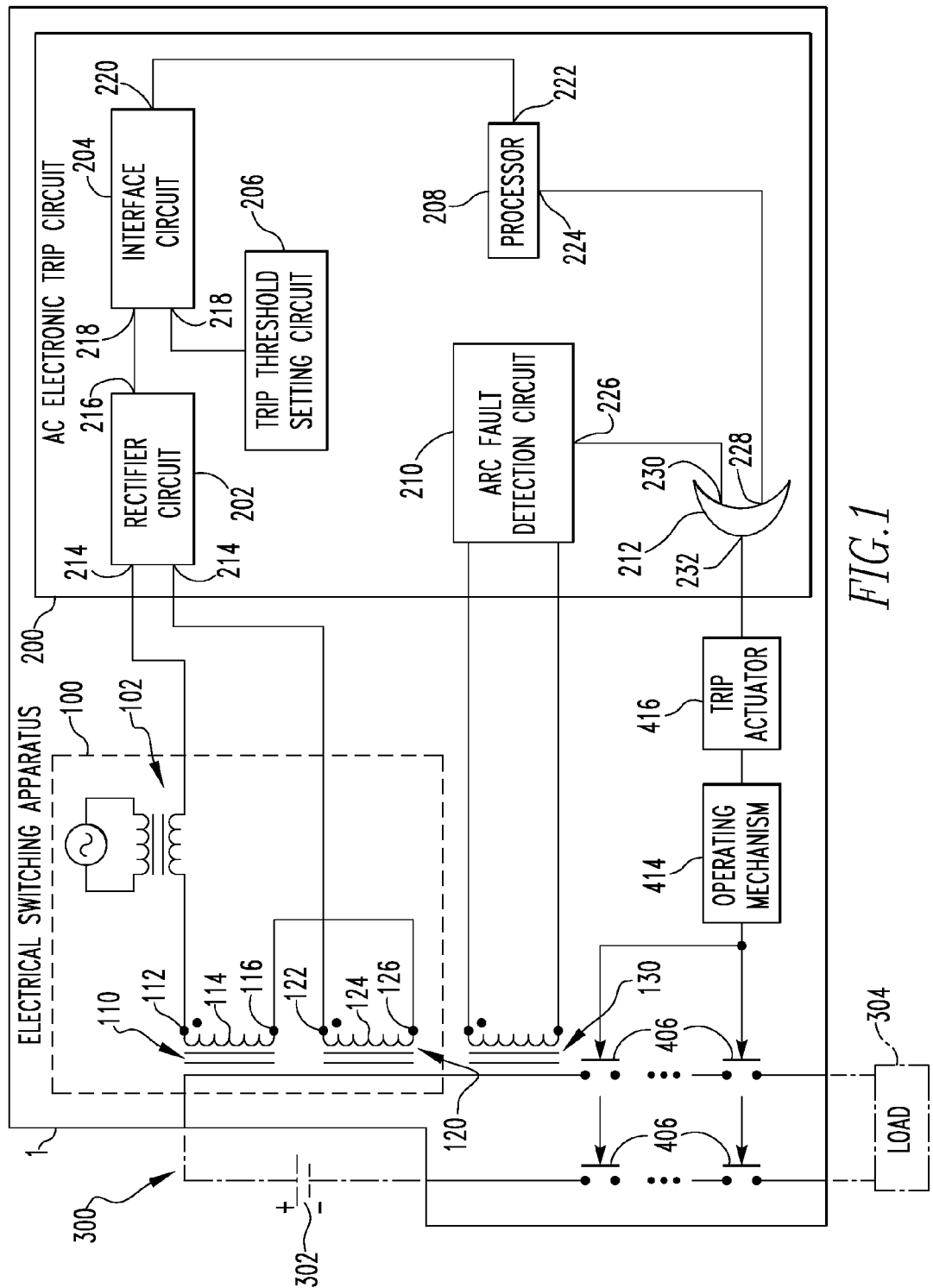
FIG. 1 is a circuit diagram in partial block form of an electrical switching apparatus electrically connected to an ungrounded load in accordance with an embodiment of the disclosed concept.

FIG. 1 is a circuit diagram of an electrical switching apparatus 1 which can be, for example and without limitation, a circuit breaker. The electrical switching apparatus 1 is electrically connected to a protected circuit 300 (shown in phantom line drawing). The protected circuit 300 includes a DC power source 302 and a potentially ungrounded DC load 304. The electrical switching apparatus 1 includes one or more pairs of separable contacts 406. The electrical switching apparatus 1 also includes an operating mechanism 414 that opens and closes the one or more pairs of separable contacts 406 and a trip actuator 416 that cooperates with the operating mechanism 414 to trip open the one or more pairs of separable contacts 406.

The electrical switching apparatus 1 further includes a transductor circuit 100 and an AC electronic trip circuit 200. The transductor circuit 100 is inductively coupled with the protected circuit 300. The transductor circuit 100 outputs an AC current to the AC electronic trip circuit 200. The AC current output by the transductor circuit 100 is proportional to the DC current flowing in the protected circuit 300 and can be used to determine a level of the DC current in the protected circuit 300.

The transductor circuit 100 includes a first current transformer 110 and a second current transformer 120. The first and second current transformers 110, 120 include respective secondary windings 114 and 124 which are inductively coupled with the protected circuit 300. The first and second current transformers 110, 120 are electrically connected in series opposition with each other such that an electromotive force induced in the first current transformer 110 by the DC current in the protected circuit 300 is opposed to an electromotive force induced in the second current transformer 120 by the DC current in the protected circuit 300. By the cancellation of the electromotive forces, this arrangement electrically neutralizes the transformer effect. The transductor circuit 100 can also be designed in a fashion that it magnetically neutralizes the transformer effect.

Figure 6:
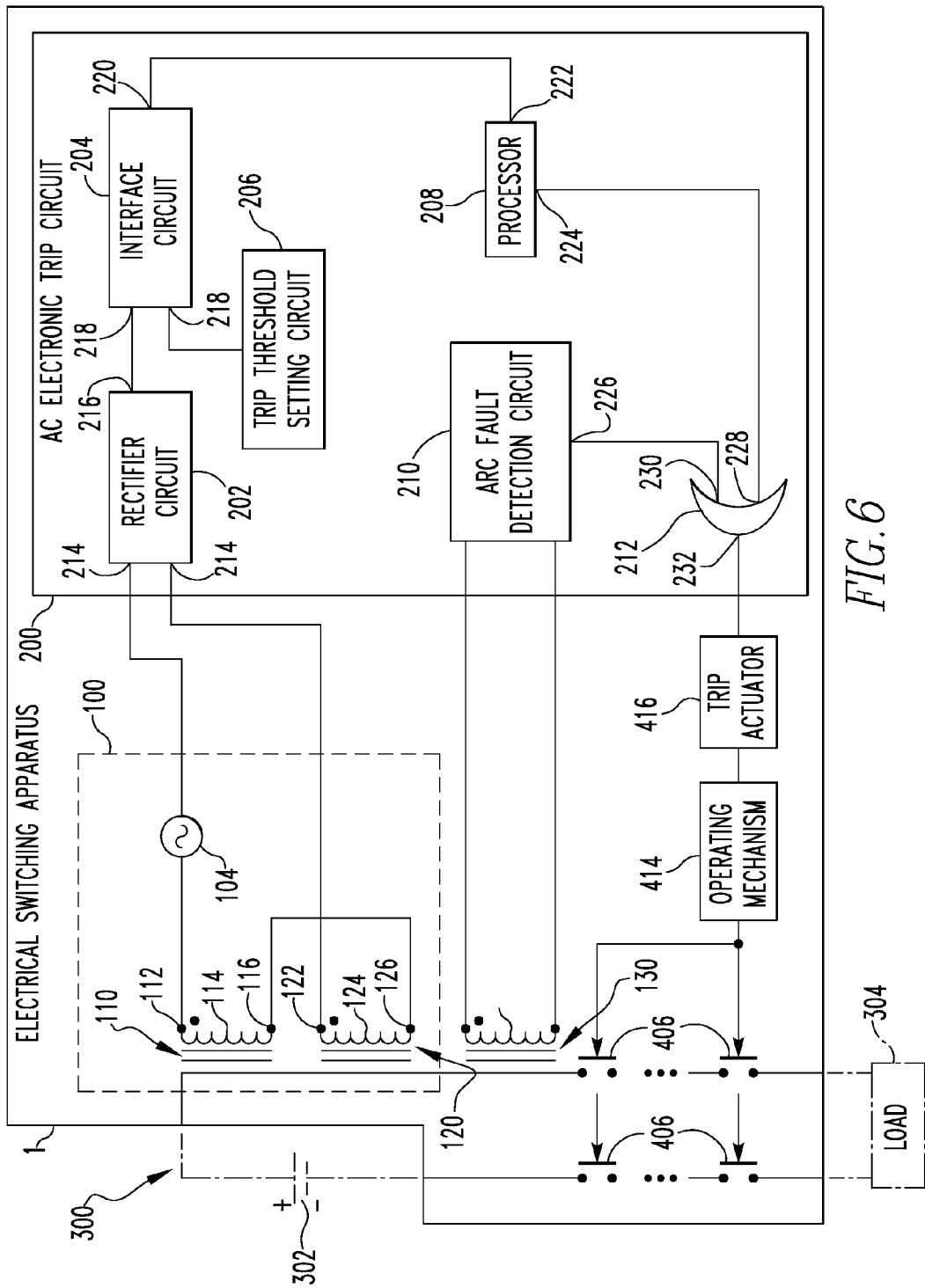
FIGS. 6 and 7 are circuit diagrams of electrical switching apparatus with alternating current excitation voltage sources in accordance with other embodiments of the disclosed concept.
Figure 7:
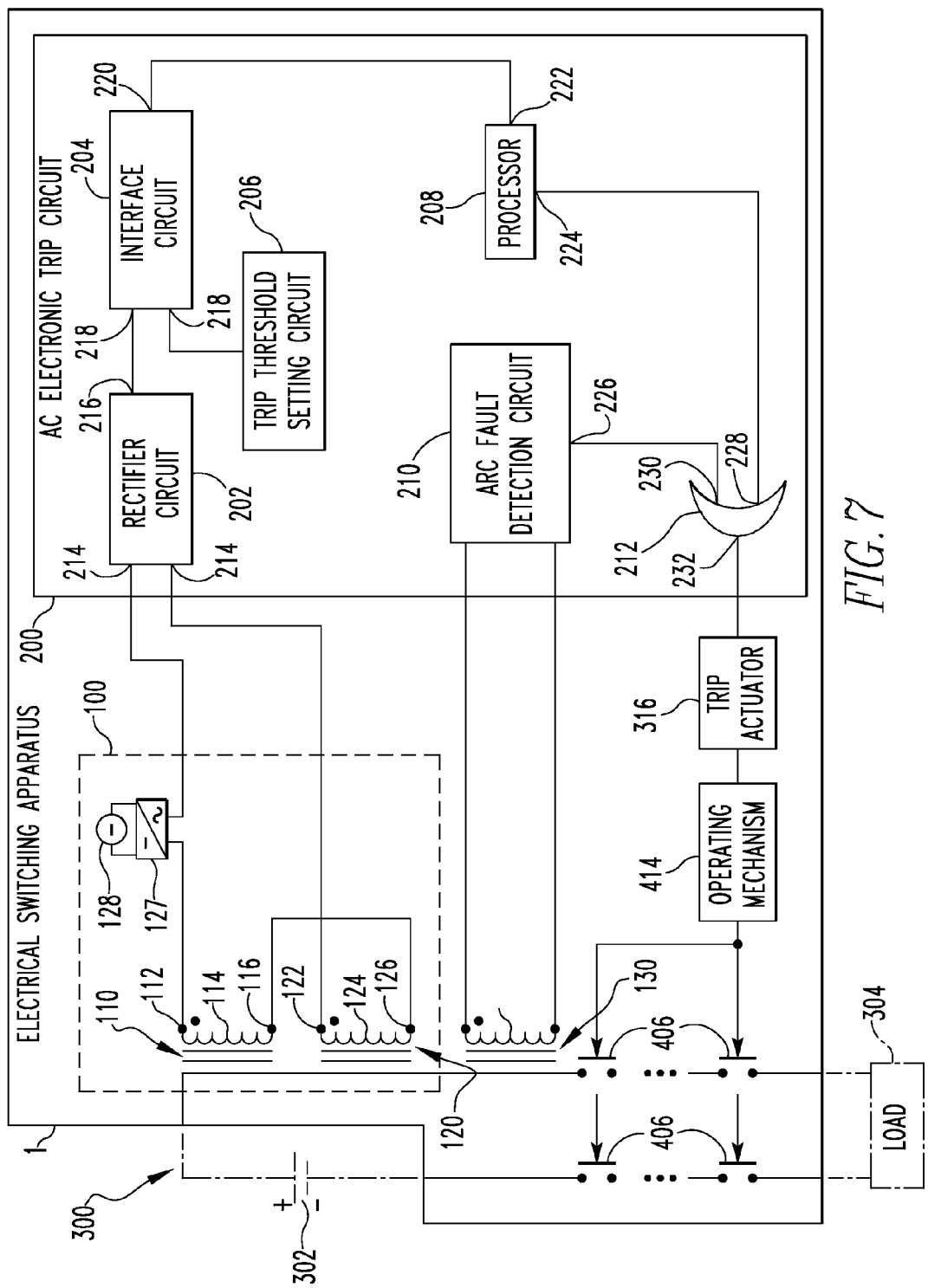

The transductor circuit 100 also includes a power source which provides an AC voltage to the secondary windings of the current transformers 110, 120. In the example shown in FIG. 1, the power source includes an AC power source 104 and a transformer 102 to isolate the AC power source 104 from the current transformers 110, 120. Arranging the current transformers 110, 120 in series opposition with each other and providing the AC power source 104 causes the transductor circuit 100 to output an AC current which is proportional to the DC current in the protected circuit 300. It is contemplated that any suitable power source may be employed to provide the AC voltage to the secondary windings of the current transformers 110, 120. For example, in one non-limiting example embodiment shown in FIG. 6, the transformer 102 is omitted from the power source and the AC power source 104 is electrically connected to the secondary winding of the first current transformer 110. In another non-limiting example embodiment shown in FIG. 7, a DC/AC inverter 127 is electrically connected to the secondary winding of the first AC current transformer 110 and converts a DC voltage generated by a second DC power source 128 into the AC voltage.

Continuing to refer to the example of FIG. 1, the secondary windings 114 and 124 of the current transformers 110, 120 have first ends 112 and 122 and second ends 116 and 126, respectively. The first end 112 of the first current transformer 110 is electrically connected to the third transformer 102. The second end 116 of the first current transformer 110 is electrically connected to the second end 126 of the second current transformer 120. The first end 122 of the second current transformer 120 is electrically connected to the AC electronic trip circuit 200. In the example shown in FIG. 2, the electrical connection between the first current transformer 110 and the second transformer 120 is changed such that the second end 116 of the first current transformer 110 is electrically connected to the first end 122 of the second current transformer 120, and the second end 126 of the second current transformer 120 is electrically connected to the AC electronic trip circuit 200. However, in both of the examples of FIGS. 1 and 2, the first current transformer 110 and the second current transformer 120 are electrically connected in series opposition with each other with respect to the electromotive forces induced by the DC current in the protected circuit 300.

Figure 2:
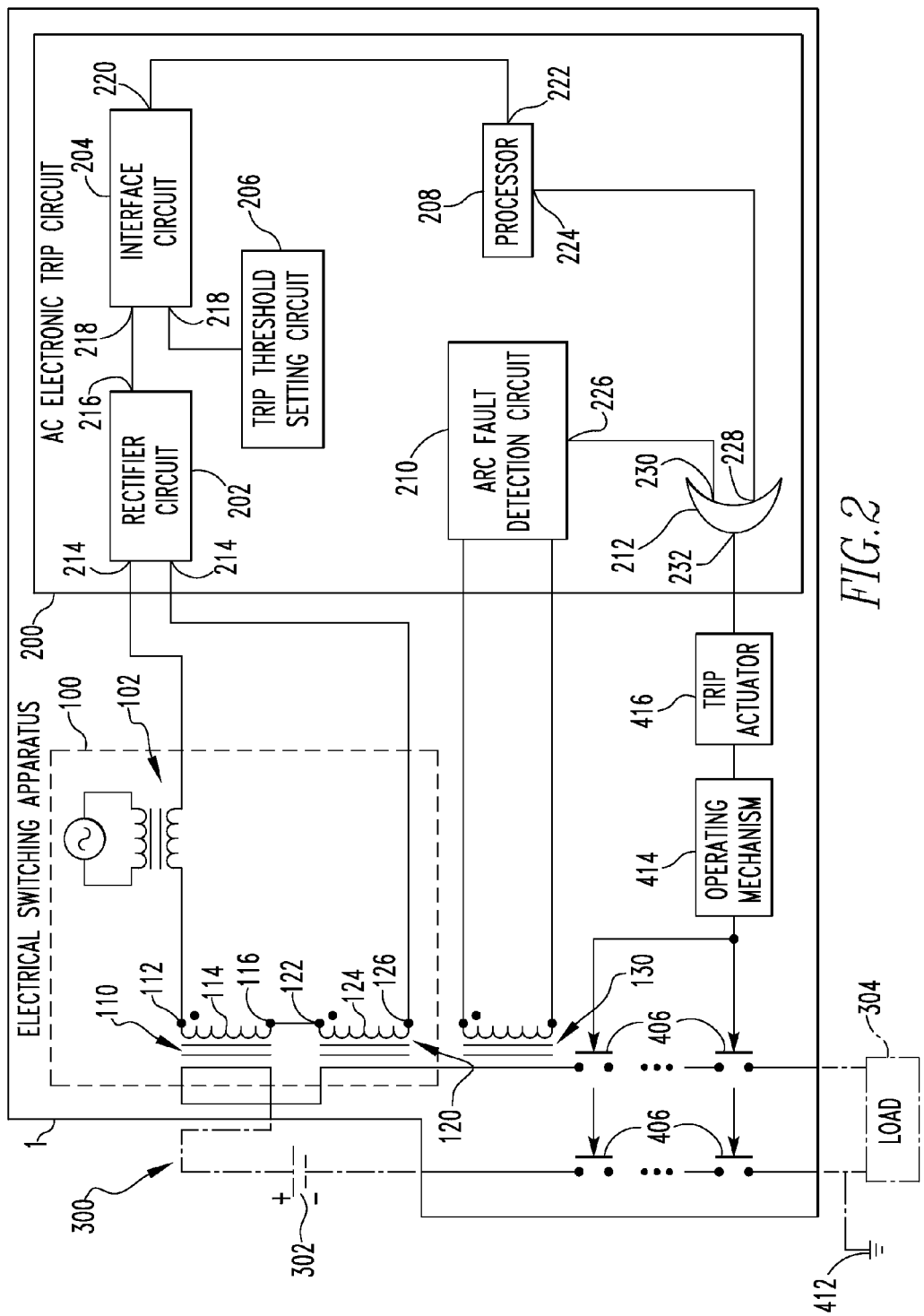
FIG. 2 is a circuit diagram in partial block form of an electrical switching apparatus electrically connected to a grounded load in accordance with another embodiment of the disclosed concept.

The electrical switching apparatus 1 also includes a current sensor such as the example third current transformer 130 as shown in FIGS. 1 and 2. The third current transformer 130 is inductively coupled to the protected circuit 300. The third current transformer 130 is configured to sense an AC component (e.g., without limitation, broadband noise) of the DC current flowing through the protected circuit 300 and to output it to the AC electronic trip circuit 200. The AC component of the DC current flowing through the protected circuit 300 can be used to detect an arc fault in the protected circuit 300.

The AC electronic trip circuit 200 is electrically connected to the transductor circuit 100 and receives the AC current output by the transductor circuit 100. The AC electronic trip circuit 200 is also electrically connected to the third transformer 130 and receives the sensed AC component of the DC current flowing through the protected circuit 300 from the third transformer 130. The AC electronic trip circuit 200 includes a rectifier circuit 202, an interface circuit 204, a trip threshold setting circuit 206, a processor 208, an arc fault detection circuit 210, and an output interface circuit 212.

The rectifier circuit 202 includes a rectifier circuit input 214 and a rectifier circuit output 216. The rectifier circuit input 214 is electrically connected to the transducer circuit 100 and is structured to receive the AC current output from the transducer circuit 100. The rectifier circuit 202 includes a full-wave rectifier and is structured to rectify the AC current. The rectifier circuit 202 outputs the rectified AC current to the rectifier circuit output 216. Although a full-wave rectifier is disclosed, it is contemplated that other suitable types of rectifiers may be employed such as, without limitation, a half-wave rectifier, with appropriate modifications to other components to support the change.

The interface circuit 204 includes an interface circuit input 218 and an interface circuit output 220. The interface circuit input 218 is electrically connected to the rectifier circuit output 216 and is structured to receive the rectified AC current. The interface circuit input 218 is also electrically connected to the trip threshold setting circuit 206. The trip threshold setting circuit 206 is structured to set a an override threshold at which the processor 222 outputs a trip control signal to cause the trip actuator 416 to control the operating mechanism 414 to trip open the separable contacts 406 instantaneously. The interface circuit output 220 is electrically connected to a processor input 222 of the processor 208.

The processor 208 is structured to monitor the processor input 222 and to determine whether a trip condition (e.g., without limitation, an over current condition) exists. The processor includes a processor output 224 that is electrically connected to a first input 228 of the output interface circuit 212. When the processor 208 determines that a trip condition exists, it outputs the trip control signal to the first input 228 of the output interface circuit 212.

The arc fault detection circuit 210 is electrically connected to the third transformer 130 and receives the sensed AC component of the DC current flowing through the protected circuit 300 from the third transformer 130. The arc fault detection circuit 210 also includes an output 226 electrically connected to the second input 230 of the output interface circuit 212. The arc fault detection circuit 210 uses the sensed AC component to detect whether an arc fault exists in the protected circuit 300. When the arc fault detection circuit 210 detects an arc fault in the protected circuit 300, it outputs an arc fault control signal at the output 226.

The output interface circuit 212 includes the first and second inputs 228,230 and an output 232. The first and second inputs 228,230 are electrically connected to processor output 224 and arc fault detection circuit output 226, respectively. The output 232 is electrically connected to the trip actuator 416. The example output interface circuit 212 is an "or" logic circuit that outputs a control signal to the trip actuator 416 to cause the trip actuator 416 to cooperate with the operating mechanism 414 to trip open the separable contacts 406 when either the trip control signal is received at the first input 228 or the arc fault control signal is received at the second input 230.

Referring to FIG. 2, an example of a different configuration of the electrical switching apparatus 1 is shown. In FIG. 2, the electrical switching apparatus 1 has a configuration that is generally suitable for a potentially grounded load where the DC load 304 is electrically connected to a ground 412.

Figure 3:
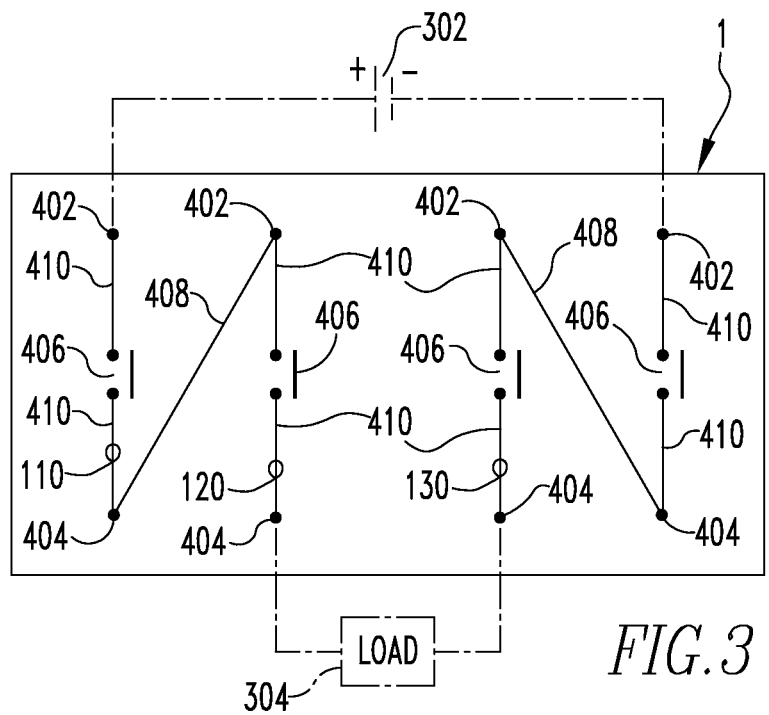
FIGS. 3 and 4 are schematic diagrams of different configurations of electrical switching apparatus in accordance with embodiments of the disclosed concept.
Figure 4:
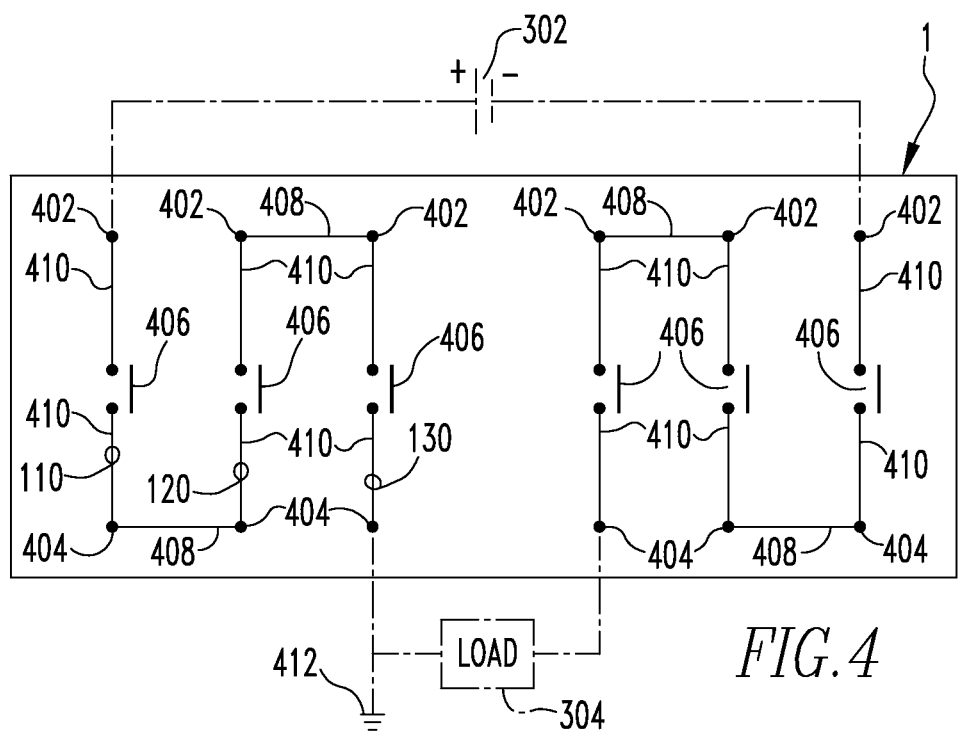

Referring to FIGS. 3 and 4, examples of different configurations of a conductive path through the electrical switching apparatus 1 are shown. FIG. 3 shows the conductive path in the electrical switching apparatus 1 configured for a potentially ungrounded DC load 304 and FIG. 4 shows the conductive path in the electrical switching apparatus configured for a potentially grounded DC load 304. The conductive path includes first terminals 402, second terminals 404, pairs of separable contacts 406, jumpers 408, and conductors 410. Two of the first terminals 402 are input terminals which are configured to electrically connect to the DC power source 302. Two of the second terminals 404 are output terminals which are structured to electrically connect to the DC load 304. The first terminals 402, second terminals 404, pairs of separable contacts 406, jumpers 408, and conductors 410 are electrically connected in series to complete a power circuit between DC power source 302 and DC load 304.

The first, second, and third current transformers 110,120, 130 are inductively coupled to at least one of the conductors 410. While FIGS. 3 and 4 show two example placements of the first, second, and third current transformers 110,120,130, the disclosed concept is not limited to those example placements. The first, second, and third current transformers 110,120,130 may be placed at any suitable location in the protected circuit order to inductively couple to any of the conductors 410.

In the example shown in FIG. 3, the jumpers 408 are each electrically connected between one of the first terminals 402 and one of the second terminals 404. In the example shown in FIG. 4, the jumpers 408 are each electrically connected between two of the first terminals 402 or two of the second terminals 404.

The change in configuration of the jumpers 408 between the examples shown in FIGS. 3 and 4 changes the direction of the electromotive force induced in one of the first and second current transformers 110, 120. As such, when the configuration of the jumpers 408 is changed between the example shown in FIG. 3 and the example shown in FIG. 4, the electrical connection between the first current transformer 110 and the second current transformer 120 is also preferably changed to keep the first current transformer 110 and the second current transformer 120 electrically connected in series opposition in order to neutralize the transformer effect. The configuration of the electrical switching apparatus 1 shown in FIG. 1 corresponds to the configuration of the conductive path shown in FIG. 3 and the configuration of the electrical switching apparatus 1 shown in FIG. 2 corresponds to the configuration of the conductive path shown in FIG. 4. The electrical connection between the first and second current transformers 110,120 changes between the configurations of FIGS. 1 and 2 to keep the first and second current transformers 110,120 electrically connected in series opposition when the configuration of the conductive path changes between the configurations of FIGS. 3 and 4, respectively.

Figure 5:
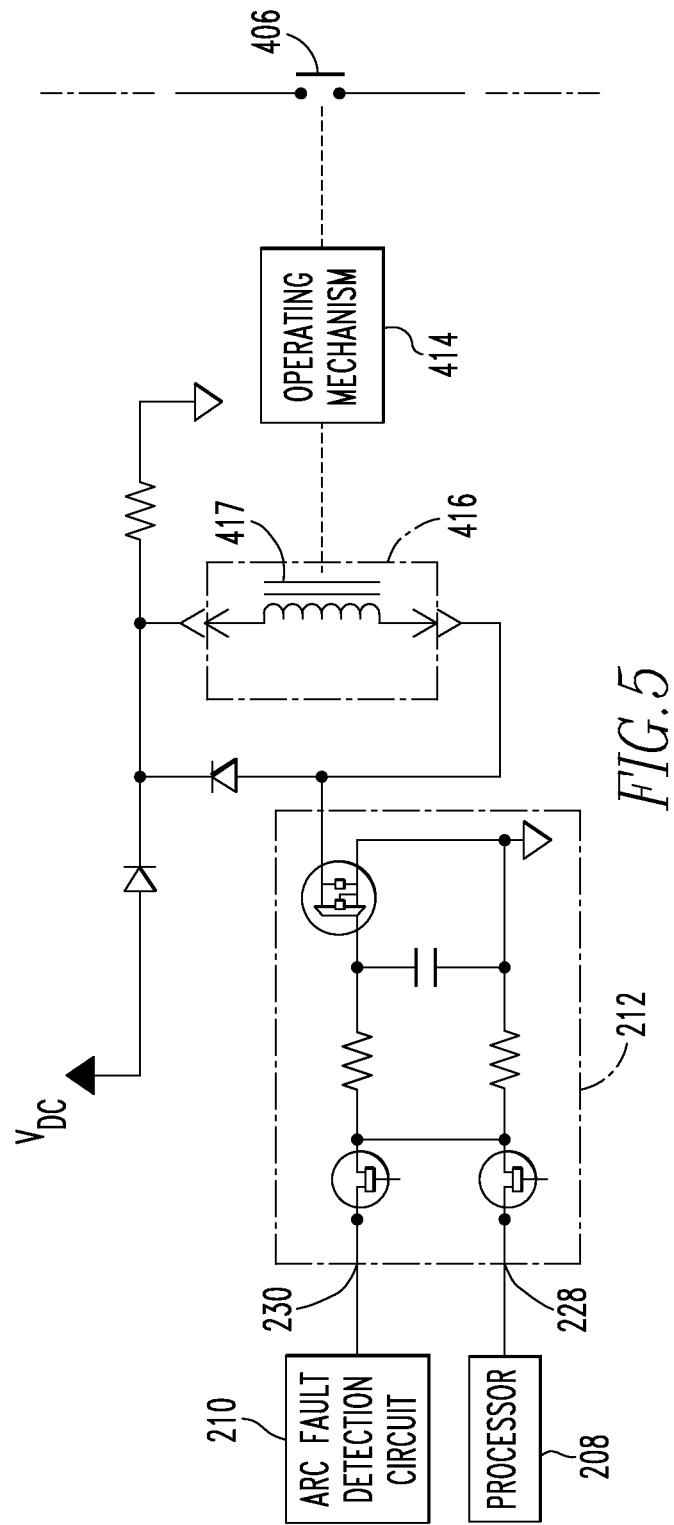
FIG. 5 is a circuit diagram in partial block form of an output interface circuit in accordance with embodiments of the disclosed concept.

Referring to FIG. 5, example circuit components of the output interface circuit 212 are shown. While one configuration of circuit components for the output interface circuit 212 is shown, it is contemplated that any suitable configuration may be employed without departing from the scope of the disclosed concept.

Continuing to refer to FIG. 5, the trip actuator 416 includes a trip coil 417 which cooperates with the operating mechanism 414. The trip coil 417 is energized by a DC voltage $V_{DC}$. The DC voltage $V_{DC}$ may be provided by any suitable power source (e.g., without limitation, a power supply included in the electrical switching apparatus).

Figure 8:
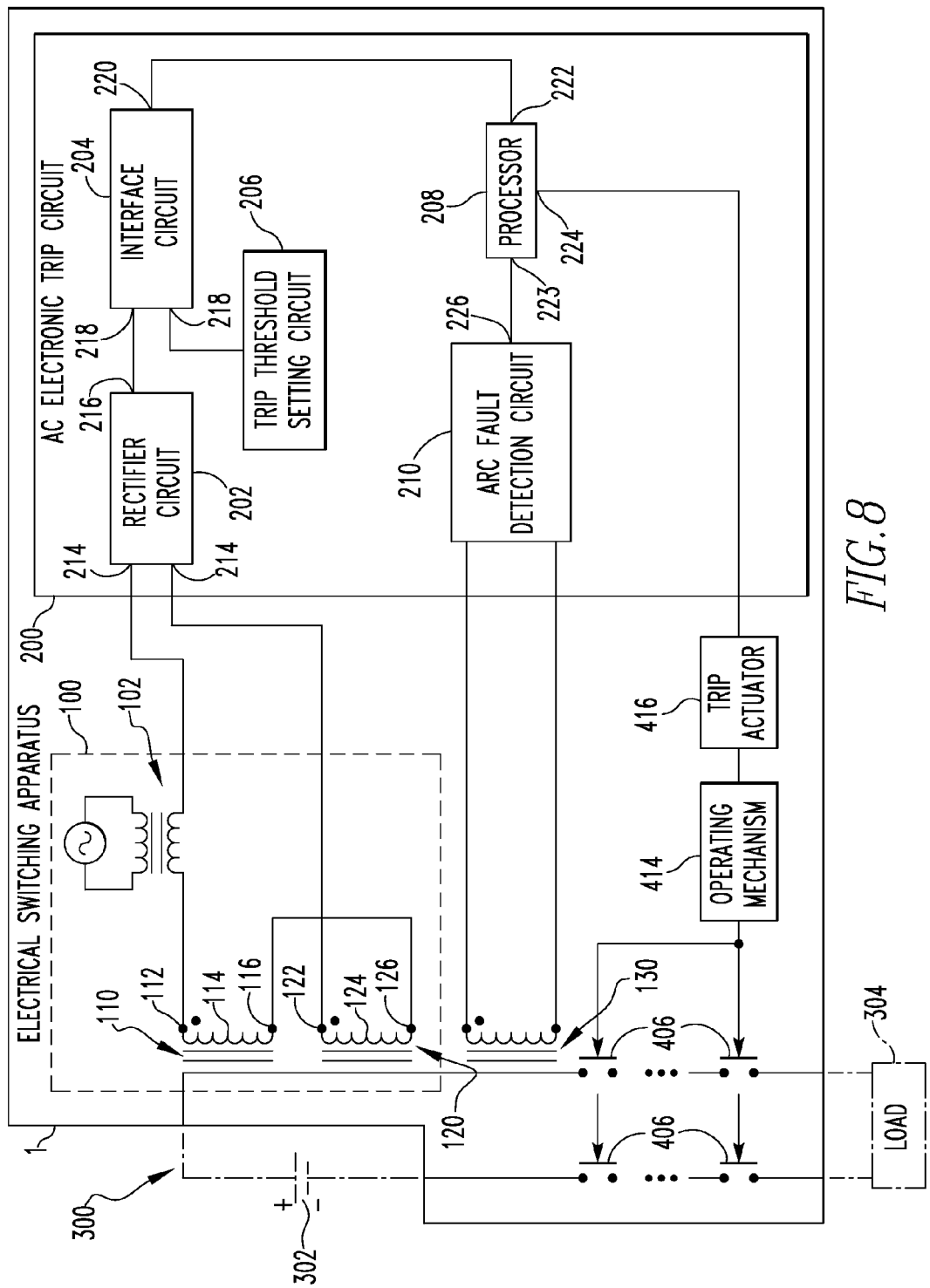
FIG. 8 is a circuit diagram in partial block form of an electrical switching apparatus in accordance with another embodiment of the disclosed concept.

Referring to FIG. 8, an example of a different configuration of the electrical switching apparatus 1 is shown. In the electrical switching apparatus 1 of FIG. 8, the arc fault detection circuit output 226 is electrically connected to a second processor input 223. In this configuration of the electrical switching apparatus 1, arc fault detection circuit 210 uses processor 208 to assist with detecting an arc fault. As such, processor 208 can output both the trip control signal and the arc fault control signal to the processor output 224. As such, output interface circuit 212 (see FIG. 1) may be omitted from the electrical switching apparatus 1 of FIG. 8.

Although separable contacts 406 are disclosed, suitable solid state separable contacts can be employed. For example, the disclosed electrical switching apparatus 1 includes a suitable circuit interrupter mechanism, such as the separable contacts 406 that are opened and closed by the disclosed operating mechanism 414, although the disclosed concept is applicable to a wide range of circuit interruption mechanisms (e.g., without limitation, solid state switches like FET or IGBT devices; contactor contacts) and/or solid state based control/protection devices (e.g., without limitation, drives; soft-starters; DC/DC converters) and/or operating mechanisms (e.g., without limitation, electrical, electro-mechanical, or mechanical mechanisms).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus comprising:
a plurality of first terminals including two input terminals structured to electrically connect to a direct current power source;
a plurality of second terminals including two output terminals structured to electrically connect to a direct current load;
a plurality of pairs of separable contacts;
an operating mechanism configured to open and close said separable contacts;
a trip actuator configured to cooperate with said operating mechanism to trip open said separable contacts;
a plurality of conductors that electrically connect each pair of separable contacts between one of said first terminals and one of said second terminals;
a transductor circuit including first and second current transformers, the transductor circuit being configured to sense a direct current component of a current flowing between at least one of the input terminals and at least one of the output terminals and to output an alternating current proportional to the direct current component;
a current sensor configured to sense an alternating current component of the current flowing between at least one of the input terminals and at least one of the output terminals; and
an alternating current electronic trip circuit including an arc fault detection circuit configured to detect an arc fault based on the sensed alternating current component, the alternating current electronic trip circuit being configured to control said trip actuator based on the alternating current output from the transductor circuit or the detected arc fault.

2. The electrical switching apparatus of claim 1, wherein the alternating current electronic trip circuit further includes:

a rectifier circuit having a rectifier circuit input and a rectifier circuit output, the rectifier circuit input being electrically connected to the transductor circuit;
an interface circuit having an interface circuit input and an interface circuit output, the interface circuit input being electrically connected to the rectifier circuit output; and
a processor having a processor input electrically connected to the interface circuit output, the processor being structured to output a trip control signal based on the alternating current output from the transductor circuit.

3. The electrical switching apparatus of claim 2, wherein the rectifier circuit includes a full-wave rectifier.

4. The electrical switching apparatus of claim 2, wherein the alternating current electronic trip circuit further includes a trip threshold setting circuit structured to set an override threshold at which the processor controls the separable contacts to trip open instantaneously.

5. The electrical switching apparatus of claim 2, wherein the arc fault detection circuit is configured to output an arc fault control signal when an arc fault is detected.

6. The electrical switching apparatus of claim 5, wherein the alternating current electronic trip circuit further includes an output interface circuit having a first input electrically connected to the processor and a second input electrically connected to the arc fault detection circuit; wherein the output interface circuit is configured to control said trip actuator to cooperate with said operating mechanism to trip open said separable contacts when the trip control signal is received at the first input or the arc fault control signal is received at the second input.

7. The electrical switching apparatus of claim 1, wherein the plurality of conductors include a first conductor and a second conductor, wherein the first current transformer has a secondary winding inductively coupled with the first conductor and the second current transformer has a secondary winding inductively coupled with the second conductor; wherein the transductor circuit includes an alternating current power circuit configured to provide an alternating voltage to the first current transformer and the second current transformer; and wherein the secondary windings of the first current transformer and the second current transformer are electrically connected in series-opposition such that an electromotive force induced in the secondary winding of the first current transformer by the direct current is in opposition with an electromotive force induced in the secondary winding of the second current transformer by the direct current.

8. The electrical switching apparatus of claim 7, wherein the alternating current power circuit includes an alternating current power source and a fourth transformer, and wherein the alternating current power source is configured to provide the alternating voltage to the first current transformer and the second current transformer via the fourth transformer.

9. The electrical switching apparatus of claim 7, wherein the alternating current power circuit includes a direct current/alternating current inverter and a second direct current power source; and wherein the direct current/alternating current inverter converts a direct current voltage generated by the second direct current power source into said alternating voltage.

10. The electrical switching apparatus of claim 8, wherein the secondary windings of each of the first current transformer and the second transformer include a first end and a second end; wherein the first end of the first current transformer is electrically connected to the fourth transformer; wherein the second end of the first transformer is electrically connected to the second end of the second transformer; and wherein the first end of the second transformer is electrically connected to the alternating current electronic trip unit.

11. The electrical switching apparatus of claim 10, wherein the direct current load is potentially ungrounded.

12. The electrical switching apparatus of claim 8, wherein the secondary windings of each of the first current transformer and the second transformer include a first end and a second end; wherein the first end of the first current transformer is electrically connected to the fourth transformer; wherein the second end of the first transformer is electrically connected to the first end of the second transformer; and wherein the second end of the second transformer is electrically connected to the alternating current electronic trip unit.

13. The electrical switching apparatus of claim 12, where the direct current load is potentially grounded.

14. The electrical switching apparatus of claim 1, wherein the current sensor is a third current transformer.

15. The electrical switching apparatus of claim 1, wherein the alternating current electronic trip circuit further includes:

a rectifier circuit having a rectifier circuit input and a rectifier circuit output, the rectifier circuit input being electrically connected to the transductor circuit;

an interface circuit having an interface circuit input and an interface circuit output, the interface circuit input being electrically connected to the rectifier circuit output; and a processor having a first processor input electrically connected to the interface circuit output, a second processor input electrically connected to the arc fault detection circuit, and a processor output electrically connected to the trip actuator, wherein the arc fault detection circuit is structured to use the processor to assist with detecting the arc fault, and wherein the processor is structured to output a trip control signal at the processor output based on the alternating current output from the transductor circuit and to output an arc fault control signal at the processor output when an arc fault is detected.

* * * * *